(12) United States Patent
Liu et al.

(10) Patent No.: US 10,152,503 B2
(45) Date of Patent: Dec. 11, 2018

(54) DATA COMMUNICATIONS SYSTEM AND METHOD THAT MAXIMIZE EFFICIENT USAGE OF COMMUNICATIONS RESOURCES

(71) Applicant: THE DUN & BRADSTREET CORPORATION, Short Hills, NJ (US)

(72) Inventors: Yufan Liu, Livingston, NJ (US); Xin Yuan, Basking Ridge, NJ (US); MeiHsiu Lin, Morris Plains, NJ (US); Nipa Basu, Warren, NJ (US)

(73) Assignee: THE DUN & BRADSTREET CORPORATION, Short Hills, NJ (US)

( * ) Notice: Subject to any disclaimer, the term of this patent is extended or adjusted under 35 U.S.C. 154(b) by 489 days.

(21) Appl. No.: 14/926,033

(22) Filed: Oct. 29, 2015

(65) Prior Publication Data

US 2017/0124132 A1 May 4, 2017

(51) Int. Cl.
*G06F 17/30* (2006.01)
*G06Q 30/02* (2012.01)

(52) U.S. Cl.
CPC .... *G06F 17/30327* (2013.01); *G06F 17/3053* (2013.01); *G06Q 30/0251* (2013.01)

(58) Field of Classification Search
CPC .......... G06F 17/30327; G06F 17/3053; G06Q 30/0251
See application file for complete search history.

(56) References Cited

U.S. PATENT DOCUMENTS

| | | | |
|---|---|---|---|
| 8,036,907 B2 | 10/2011 | Davies et al. | |
| 8,543,437 B2 | 9/2013 | Narvaez et al. | |
| 9,886,428 B2* | 2/2018 | Bhogal | G06F 17/24 |
| 2003/0182177 A1 | 9/2003 | Gallagher et al. | |
| 2006/0106832 A1* | 5/2006 | Ben-Dyke | G06F 17/30327 |
| 2009/0077076 A1* | 3/2009 | Berger | G06F 17/30327 |
| 2012/0109717 A1* | 5/2012 | Ma | G06Q 10/06 705/7.36 |
| 2013/0007153 A1* | 1/2013 | Maynard | G06Q 10/107 709/206 |

(Continued)

OTHER PUBLICATIONS

Mollamotalebi, Mandi; Maghami, Raheleh; Ismail, Abdul Samad. Computing. Archives for Informatics and Numerical Computation; Wien vol. 97, Iss. 5, (May 2015): 439-458. DOI:10.1007/s00607-014-0427-4 (Year: 2015).*

(Continued)

*Primary Examiner* — Amanda C Abrahamson
(74) *Attorney, Agent, or Firm* — Ohlandt, Greenley, Ruggiero & Perle, L.L.P.

(57) ABSTRACT

There is provided a method that includes (a) receiving a unique identifier of a first entity, (b) constructing a family tree of entities that includes the first entity, (c) calculating a decision-making power score for each entity in the family tree in accordance with a rule, thus yielding decision-making power scores, (d) identifying a decision-making entity in the family tree, based on the decision-making power scores, thus yielding an identification of the decision-making entity, and (e) controlling a messaging system to direct a correspondence to a recipient, based on the identification of the decision-making entity. There is also provided a system that performs the method, and a storage device for storing instructions for a processor to perform the method.

9 Claims, 5 Drawing Sheets

(56) References Cited

U.S. PATENT DOCUMENTS

| | | | |
|---|---|---|---|
| 2013/0173243 A1* | 7/2013 | Kayton | G06F 17/5009 703/13 |
| 2016/0219009 A1* | 7/2016 | French | H04L 51/14 |
| 2017/0063685 A1* | 3/2017 | Vedantham | H04L 45/48 |

OTHER PUBLICATIONS

Chakraborty, Suchetana; Chakraborty, Sandip; Karmakar, Sushanta; Nandi, Sukumar. Dynamic Tree Switching for Distributed Message-Passing Applications. Journal of Network and Systems Management 23. 1: 1-40. Springer Science & Business Media. (Jan. 2015) (Year: 2015).*

Transmittal of the International Search Report dated Jan. 9, 2017 from corresponding International PCT Application No. PCT/US16/58377, 3 pages.

Written Opinion of the International Searching Authority dated Jan. 9, 2017 from corresponding International PCT Application No. PCT/US16/58377, 13 pages.

\* cited by examiner

Frequency Table (500)

| Decision making power range | Percentage |
|---|---|
| 9-10 | 0.39% |
| 8-9 | 0.44% |
| 7-8 | 0.55% |
| 6-7 | 0.65% |
| 5-6 | 0.87% |
| 4-5 | 1.25% |
| 3-4 | 1.59% |
| 2-3 | 4.5% |
| 1-2 | 5% |
| 0-1 | 5.41% |

Difference Table (505)

| Cutoff | Absolute difference of percentage in two adjacent decision making power ranges |
|---|---|
| 9 | 0.44%-0.39%=0.05% |
| 8 | 0.55%-0.44%=0.11% |
| 7 | 0.65%-0.55%=0.1% |
| 6 | 0.87%-0.65%=0.22% |
| 5 | 1.25%-0.87%=0.38% |
| 4 | 1.59%-1.25%=0.34% |
| 3 | 4.5%-1.59%=2.91% |
| 2 | 5%-4.5%=0.5% |
| 1 | 5.41-5%=0.41% |

FIG. 5

DATA COMMUNICATIONS SYSTEM AND METHOD THAT MAXIMIZE EFFICIENT USAGE OF COMMUNICATIONS RESOURCES

BACKGROUND OF THE DISCLOSURE

1. Field of the Disclosure

The present disclosure relates to data communications, and more particularly, to a system that maximizes efficient usage of communications resources.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

In the business world, there are millions of business hierarchies, and tens of millions of business locations. There are also millions of large corporate families having more than 50 business locations. Many of the large corporate families have family trees with complicated structures.

Most businesses strive for precision marketing when targeting new business opportunities or cultivating existing relationships. However, for precision marketing, an individual site level is often too granular, and a global ultimate (i.e., the business entity that is at the top of hierarchy, globally) is often too broad, especially for the large corporate families. Moreover, a domestic ultimate (i.e., the business entity that is at the top of a hierarchy within a country) is often not an appropriate level because in the country of the global ultimate, only one domestic ultimate is identified, and that one domestic ultimate is also the global ultimate, and there may exist many other decision-making entities in the same country as the global ultimate. Also, a domestic ultimate can be a foreign branch with very low decision-making authority.

In marketing campaigns, correspondences are often sent from marketers to many potential clients, and sometimes to entities that have little or no decision-making authority. In some cases, correspondences are transmitted to many recipients, where few, if any, of the recipients have decision-making authority. Such transmissions are an inefficient use of communications resources, i.e., processing power and bandwidth.

There is a need for a system that maximizes efficient usage of communications resources.

SUMMARY OF THE DISCLOSURE

It is an object of the present disclosure to provide for a method and a system that maximizes efficiency and utilization of data communications by directing correspondences to entities that are most appropriate recipients, rather than broadly, or indiscriminately, transmitting correspondences to many recipients.

Accordingly, there is provided a method that includes (a) receiving a unique identifier of a first entity, (b) constructing a family tree of entities that includes the first entity, (c) calculating a decision-making power score for each entity in the family tree in accordance with a rule, thus yielding decision-making power scores, (d) identifying a decision-making entity in the family tree, based on the decision-making power scores, thus yielding an identification of the decision-making entity, and (e) controlling a messaging system to direct a correspondence to a recipient, based on the identification of the decision-making entity. There is also provided a system that performs the method, and a storage device for storing instructions for a processor to perform the method.

BRIEF DESCRIPTION OF THE DRAWINGS

FIG. 5 is an illustration of a frequency table and a difference table.

A component or a feature that is common to more than one drawing is indicated with the same reference number in each of the drawings.

DESCRIPTION OF THE DISCLOSURE

The system disclosed herein maximizes efficiency and utilization of data communications by directing correspondences to entities that are most appropriate recipients, rather than broadly, or indiscriminately, transmitting correspondences to many recipients.

Figure 1:
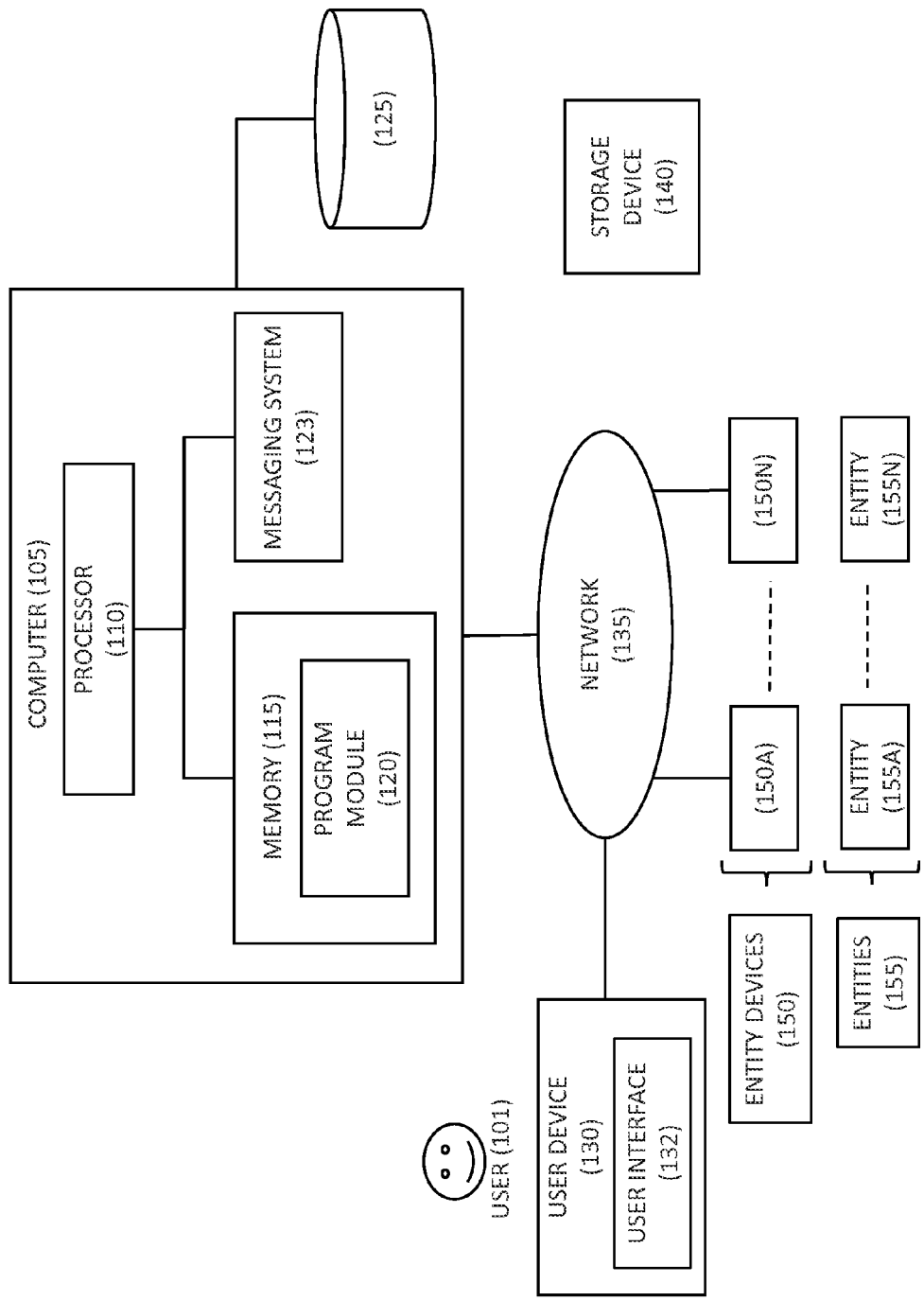
FIG. 1 is a block diagram of a system that maximizes efficient usage of communications resources.

FIG. 1 is a block diagram of a system 100 that maximizes efficient usage of communications resources. System 100 includes a network 135, a computer 105, a user device 130, and a plurality of entity devices that are collectively referred to as entity devices 150. Computer 105, user device 130, and entity devices 150 are communicatively coupled to network 135. Exemplary embodiments of user device 130 and entity devices 150 include smart phones and computers.

Network 135 is a data communications network. Network 135 may be a private network or a public network, and may include any or all of (a) a personal area network, e.g., covering a room, (b) a local area network, e.g., covering a building, (c) a campus area network, e.g., covering a campus, (d) a metropolitan area network, e.g., covering a city, (e) a wide area network, e.g., covering an area that links across metropolitan, regional, or national boundaries, (f) the Internet, (g) a telephone network, and (h) a network for communicating text messages. Communications are conducted via network 135 by way of electronic signals and optical signals.

User device 130 is operated by a user 101. User device 130 includes a user interface 132 that in turn includes an input device, such as a keyboard, speech recognition subsystem, or gesture recognition subsystem, for enabling user 101 to communicate information, via network 135, to computer 105. User interface 132 also includes an output device such as a display or a speech synthesizer. A cursor control or a touch-sensitive screen allows user 101 to utilize user interface 132 for communicating additional information and command selections to computer 105.

Entity devices 150 are operated by entities that are collectively referred to as entities 155. Two of entity devices 150 are individually identified as entity device 150A and entity device 150N, and two of entities 155 are individually identified as entity 155A and entity 155N. Entity 155A operates entity device 150A, and entity 155N operates entity device 150N.

Computer 105 includes a processor 110, a memory 115 coupled to processor 110, and a messaging system 123. Although computer 105 is represented herein as a standalone device, it is not limited to such, but instead can be coupled to other devices (not shown) in a distributed processing system. Computer 105 is coupled to a database 125.

Processor 110 is an electronic device configured of logic circuitry that responds to and executes instructions.

Memory 115 is a tangible, non-transitory, computer-readable storage device encoded with a computer program. In this regard, memory 115 stores data and instructions, i.e., program code, that are readable and executable by processor 110 for controlling the operation of processor 110. Memory 115 may be implemented in a random access memory (RAM), a hard drive, a read only memory (ROM), or a combination thereof. One of the components of memory 115 is a program module 120.

Program module 120 contains instructions for controlling processor 110 to execute processes described herein. The term "module" is used herein to denote a functional operation that may be embodied either as a stand-alone component or as an integrated configuration of a plurality of subordinate components. Thus, program module 120 may be implemented as a single module or as a plurality of modules that operate in cooperation with one another. Moreover, although program module 120 is described herein as being installed in memory 115, and therefore being implemented in software, it could be implemented in any of hardware (e.g., electronic circuitry), firmware, software, or a combination thereof.

While program module 120 is indicated as being already loaded into memory 115, it may be configured on a storage device 140 for subsequent loading into memory 115. Storage device 140 is a tangible, non-transitory, computer-readable storage device that stores program module 120 thereon. Examples of storage device 140 include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random access memory, and (i) an electronic storage device coupled to computer 105 via network 135.

Messaging system 123, e.g., an email system, a text messaging system, or a voice messaging system, is a component that transmits correspondences, e.g., emails, text messages, or voice mails, to entity devices 150.

Briefly, in operation, computer 105 receives, from user device 130, a request to direct a correspondence to a decision-making entity in a business hierarchy, where the decision-making entity is one of entities 155. Processor 110, under control of program module 120, analyzes the business hierarchy, and identifies the decision-making entity. Based on the identity of the decision-making entity, processor 110 will address a correspondence to a recipient, and control messaging system 123 to send the correspondence to a device that is operated by the recipient. For example, processor 110 addresses the correspondence to the decision-making entity, and controls email system 123 to send the correspondence to an entity device, i.e., one of the entity devices 150, that is operated by the decision-making entity.

Figure 2:
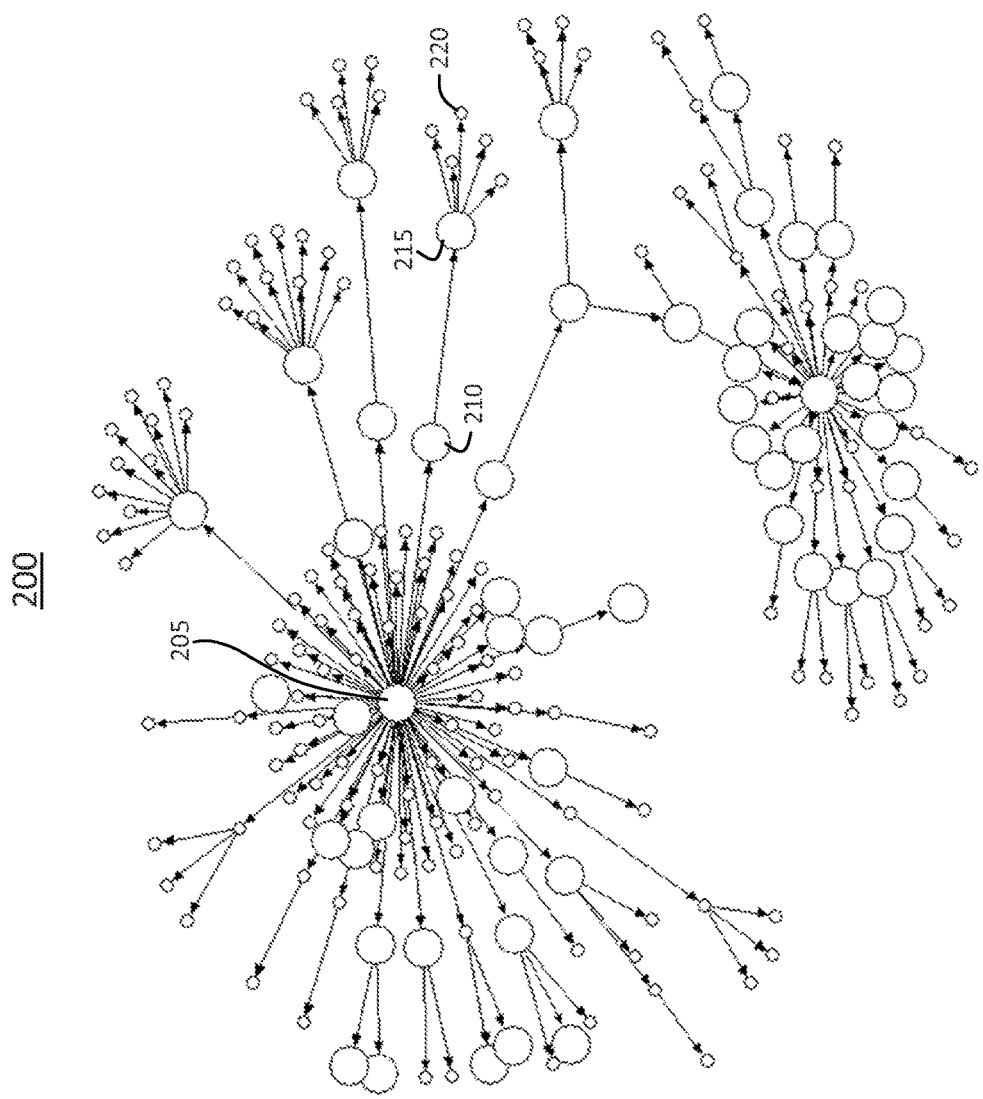
FIG. 2 is a graphic representation of a family tree for a business hierarchy.

FIG. 2 is a graphic representation of a family tree 200 for a business hierarchy, e.g., a corporate family structure. Relationships between entities in family tree 200 are represented by vectors, such that a vector is directed from an entity that is higher in the hierarchy, to an entity that is lower in the hierarchy. For example, family tree 200 includes entities 205, 210, 215 and 220. Entity 205 has no vectors pointing to it, and only vectors emanating from it. Therefore, entity 205 is at the top of the hierarchy. From entity 205, there is a vector directed to entity 210. Thus, entity 210 is subordinate to entity 205. Similarly, entity 215 is subordinate to entity 210, and entity 220 is subordinate to entity 215. Entity 220 has no vector emanating therefrom, and so, entity 220 has no subordinates.

Figure 3:
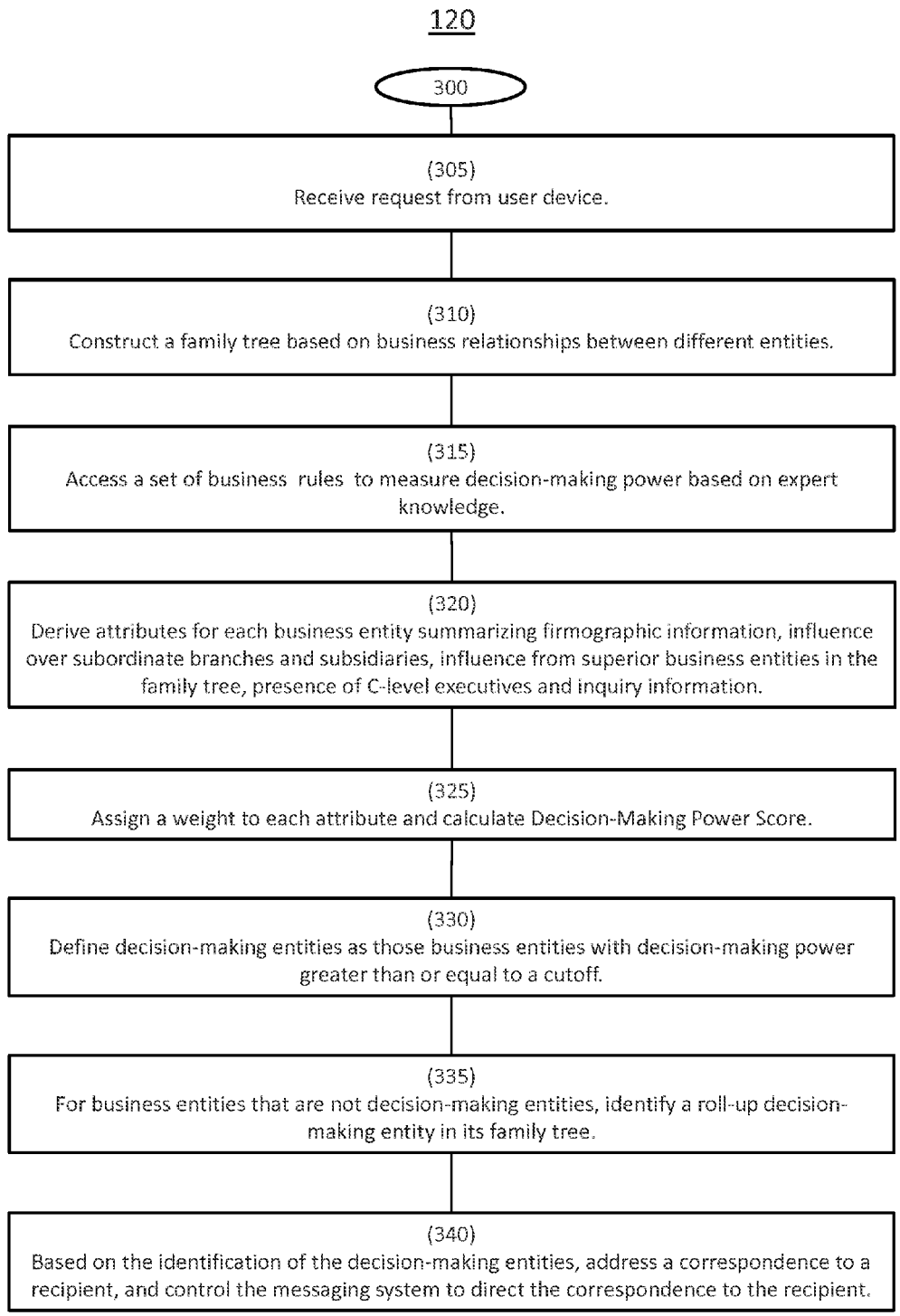
FIG. 3 is a flowchart of a process performed by the system of FIG. 1.

FIG. 3 is a flowchart of a process, i.e., method 300, performed by processor 110 in accordance with program module 120. Method 300 commences with step 305.

In step 305, processor 110 receives, from user device 130, a request to send a correspondence to a decision-maker in a business hierarchy. The request includes a unique identifier, e.g., a data universal numbering system (DUNS) number, that uniquely identifies a business entity.

After step 305, method 300 progresses to step 310.

In step 310, given the unique identifier of a business entity, processor 110 constructs a family tree based on business relationships between different entities in the business hierarchy of which the business entity is a member.

Database 125 contains data from which processor 110 will construct the family tree. The data is organized by the unique identifier, and for each unique identifier includes a postal address, a phone number, number of employees, sales volume, business relationships, and names and titles of business contacts.

The business relationships could include a subsidiary-to-parent relationship, a branch-to-headquarter relationship, a joint venture-to-parent relationship, and a franchise-to-franchiser relationship. A subsidiary is a corporation that is more than 50% owned by another corporation, and will have a different legal business name from its parent company. A branch is a secondary location of its headquarters with no legal responsibility for its debts, even though bills may be paid from the branch location. A joint venture is a commercial enterprise undertaken jointly by two or more parties. A franchiser is a party in a franchising enterprise that ultimately owns the rights, trademarks and proprietary knowledge of the specific business entity. Processor 110 employs a recursive mapping technique to construct the family tree, as described below.

Figure 4:
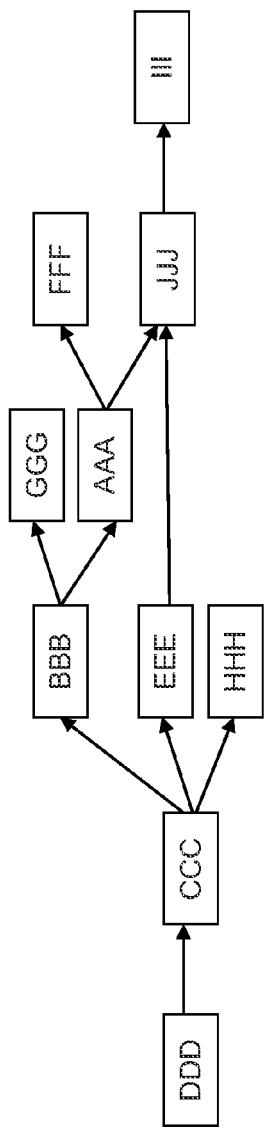
FIG. 4 is an illustration of several tables that represent exemplary business relationships, and a graph that illustrates a family tree based on the business relationships.

FIG. 4 is an illustration of several tables, namely tables 405, 410 and 415, that represent exemplary business relationships, and a graph 420 that illustrates a family tree based on the business relationships. For example, assume business entities AAA, BBB, CCC, DDD, EEE, FFF, GGG, HHH, III and JJJ have relationships as set forth in tables 405, 410 and 415.

Given a business entity, processor 110 finds the parent/headquarter of the business entity, adds the parent/headquarter to the family tree, and repeats this process recursively until no further parent/headquarter is found. In the example in FIG. 4, assume AAA is given. Processor 110 first finds AAA's parent, BBB, and then BBB's parent, CCC, and then CCC's parent, DDD. Since DDD has no parent/headquarter, it is considered to be the global ultimate of AAA.

After finding the global ultimate, processor 110 finds subsidiaries/branches of the global ultimate, adds the subsidiaries/branches to the family tree, and repeats this process recursively until no further subsidiary/branch is found. In the example in FIG. 4, the global ultimate, DDD only has one subsidiary (CCC). Processor 110 finds all subsidiaries/branches of CCC. CCC has 2 subsidiaries (BBB and EEE) and a branch (HHH). Processor 110 then finds all subsidiaries/branches of BBB, EEE and HHH. This process runs recursively, until no further subsidiary/branch is found.

Graph 420 is an illustration of a resultant family tree, which is stored by processor 110 in database 125 as a linked data structure.

Referring again to FIG. 3, after step 310, method 300 progresses to step 315.

In step 315, processor 110 accesses a set of business rules created by experts, and measures decision-making power of each business entity in the family tree. Examples of such business rules include:

1. A business entity with more subsidiaries has higher decision-making power than a business entity with fewer subsidiaries.
2. A business entity with more branches has higher decision-making power that a business entity with fewer branches.
3. A business entity with a foreign subsidiary has higher decision-making power than a business entity with a subsidiary in the same country.
4. A business entity with a foreign branch has higher decision-making power than a business entity with a branch in the same country.
5. A business entity with a subsidiary has higher decision-making power than a business entity with a branch.
6. A foreign subsidiary has more decision-making power than a subsidiary in the same country of its parent.
7. A subsidiary in the same line of business of its parent receives more business direction from its parent.
8. A subsidiary directly under a global ultimate has higher decision-making power than an indirect subsidiary.
9. A business entity where C-level executives are located at the site has higher decision-making power. The highest-level executives in senior management usually have titles beginning with "chief" and are therefore usually called "C-level". Traditionally, three such officers are chief executive officer (CEO), chief operations officer (COO), and chief financial officer (CFO).
10. A business entity with more employees working at its site has higher decision-making power than a business entity with fewer employees working at its site.
11. A business entity whose information was viewed by other business entities more times has more business interactions with other companies and therefore higher decision-making power.
12. A business entity that was searched by other business entities more times has more business interactions with other companies and therefore higher decision-making power.
13. A holding company exists for the sole purpose of controlling another company rather than for the purpose of producing its own goods or services. Therefore it has no decision-making power.

The decision-making power for different decisions can be different. For example, a business entity that engages in a lot of marketing may have high advertising decision-making power but low computer-purchasing decision-making power. Thus, the business rules can be added, modified or deleted by experts to measure the decision-making power for different decisions.

After step 315, method 300 progresses to step 320.

In step 320, for each business entity in the family tree, processor 110 derives attributes based on the business rules in step 315, summarizing firmographic information, influence over subordinate branches and subsidiaries, influence from superior business entities in the family tree, presence of C-level executives and inquiry information, thus yielding a set of attributes. Firmographics are descriptive attributes of business entities that can be used to aggregate individual business entities into meaningful market segments, for example, industry.

Examples of attributes for a particular business entity include:

1. Number of subsidiaries directly reporting to this particular business entity.
2. Number of branches directly reporting to this particular business entity.
3. Number of subsidiaries indirectly reporting to this particular business entity.
4. Number of branches indirectly reporting to this particular business entity.
5. Number of foreign subsidiaries directly reporting to this particular business entity.
6. Number of foreign subsidiaries indirectly reporting to this particular business entity.
7. Number of foreign branches directly reporting to this particular business entity.
8. Number of foreign branches indirectly reporting to this particular business entity.
9. Number of subsidiaries doing the same line of business under this particular business entity.
10. Whether this particular business entity is in a different country of all business entities in its reporting chain.
11. The hierarchy level of this particular business entity.
12. Number of employees at this particular business entity.
13. Number of C-level executives or above located at this particular business entity.
14. Number of times that this particular business entity was searched by other business entities in the past 12 months.
15. Number of times that the information of this particular business entity was viewed by other business entities in the past 12 months.

For example, the number of subsidiaries indirectly reporting to the business entity equals the number of subsidiaries under the business entity minus the number of subsidiaries directly reporting to the business entity. The number of subsidiaries under the business entity is calculated using a recursive mapping technique similar to that used in step 310. Processor 110 first finds the subsidiaries of a target business entity. For each subsidiary found, processor 110 then finds its subsidiaries. This operation is repeated until no more subsidiaries can be found. Attributes 3, 4, 6 and 8-11, from the foregoing list of example attributes, are derived using similar recursive mapping techniques.

After step 320, method 300 progresses to step 325.

In step 325, processor 110 assigns a weight to each attribute, thus yielding weighted attributes, and calculates a decision-making power score for each business entity in the family tree, thus yielding a set of decision-making power scores. One way to assign weights is to use a survey. A survey with various family tree scenarios is designed and distributed to one or more family tree experts. The weights are adjusted based on answers to the survey. For example, the initial weight for number of subsidiaries directly reporting to the business entity is 1, and the weight for number of branches directly reporting to the business entity is 0.2. The following survey question is asked: "Business entity A has 1 subsidiary and business entity B has 5 branches. If all other characteristics of A and B are the same, which of A or B do you think has the higher decision-making power?" If a majority of the responders answer A, then processor 110 increases the weight for number of subsidiaries to 1.1. If a majority of the responders answer B, then processor 110 increases the weight for number of branches to 0.3. If a majority of the responders answer that A and B have similar decision-making power, then the weights remain unchanged.

Examples of adjustments to the weights are as follows:
If this business entity is a branch or a holding company, then decision-making power=0,
otherwise, decision-making power=
Number of subsidiaries directly reporting to this business entity
+0.2*Number of branches directly reporting to this business entity
+0.8*Number of subsidiaries indirectly reporting to this business entity
+0.1*Number of branches indirectly reporting to this business entity
+0.8*Number of foreign subsidiaries directly reporting to this business entity
+0.6*Number of foreign subsidiaries indirectly reporting to this business entity
+0.2*Number of foreign branches directly reporting to this business entity
+0.1*Number of foreign branches indirectly reporting to this business entity
+0.4*Number of subsidiaries doing the same line of business under this business entity
−0.2*The hierarchy level of this business entity in the family tree
+3 if this business entity is in a different country than all business entities in its reporting chain
+0.25 if the number of employees in this business entity ≥50
+0.5 if the number of employees in this business entity ≥500
+0.3 if there is a C-level executive or above located at this business entity
+0.25 if number of times that the information of this particular business entity was viewed by other business entities in the past 12 months ≥1
+0.25 if number of times that the information of this particular business entity was viewed by other business entities in the past 12 months ≥5
+0.2 if number of times that this particular business entity was searched by other business entities in the past 12 months ≥100
+0.2 if number of times that this particular business entity was searched by other business entities in the past 12 months ≥500,
where "*" signifies multiplication.

For example, if a business entity:
(a) is not a branch or a holding company;
(b) has 2 subsidiaries directly reporting to it; and
(c) has 3 branches directly reporting to it,
then its decision making power=2+(0.2*3)=2.6.

After step 325, method 300 progresses to step 330.

In step 330, given the decision-making power score from step 325, processor 110 defines decision-making entities as those business entities with decision-making power greater than or equal to a threshold, referred to herein as a cutoff. To find the cutoff, processor 110 calculates decision power for all business entities excluding branches in a stratified random sample. A stratified random sample is a random sample in which members of the population are first divided into strata and then randomly selected to be a part of the sample. For example, processor 110 first divides all family trees into 3 strata, namely (i) large family trees with 200 or more business entities, (ii) median family trees with 50 to 199 business entities, and (iii) small family trees with less than 50 business entities, and then randomly selects 200 family trees from each stratum.

Processor 110 chooses the cutoff from a list of provided values. An example of such list is 1, 2, 3, 4, 5, 6, 7, 8, 9. One way to choose the cutoff is to use a frequency table and a difference table.

FIG. 5 is an illustration of a frequency table 500 and a difference table 505. Processor 110 first calculates the percentages of business entities in decision-making power ranges adjacent to the cutoffs in the list from the stratified random sample. The first column in frequency table 500 is the decision-making power ranges adjacent to the cutoffs in the list. The second column in frequency table 500 is the percentage of business entities with decision-making power in the range of the first column, i.e., the number of business entities with decision-making power in the range of first column divided by total number of business entities. Processor 110 then calculates difference table 505 using the values in frequency table 500. In difference table 505, the first column is the list of cutoffs, and the second column is an absolute difference between the percentages of business entities in two adjacent decision-making power ranges of first column, i.e., the absolute difference of the percentage in two decision-making power ranges next to the cutoff in frequency table 500.

Processor 110 chooses from the difference table 505, the cutoff that maximizes the absolute difference between the percentages of business entities in two decision-making power ranges adjacent to the cutoff. For example, in difference table 505, cutoff=3 has the highest absolute difference, i.e., 2.91%. So processor 110 chooses cutoff to be 3.

Processor 110 compares, to the cutoff, individual decision-making power scores, thus yielding a set of comparisons. Processor defines decision-making entities as those business entities with decision-making power scores greater than or equal to the cutoff, and thus identifies decision-making entities from the set of comparisons.

After step 330, method 300 progresses to step 335.

In step 335, processor 110 identifies, from the set of comparisons, entities that are not decision-making entities, i.e., non-decision-making entities, and identifies roll-up decision-making entities, i.e., decision-making entities for the non-decision-making entities. For a business entity that is a non-decision-making entity, processor 110 defines a roll-up decision-making entity as the first decision-making entity that processor 110 encounters as it walks up a reporting chain in the family tree, i.e., traverses the family tree from one level to a next higher hierarchical level, from the non-decision-making entity. The roll-up decision-making entity for a decision-making entity is the decision-making entity itself. Processor 110 employs a recursive technique, similar to that of step 310, to find the roll-up decision-making entity.

After step 335, process 300 progresses to step 340.

In step 340, based on the identification of the decision-making entities, processor 110 addresses a correspondence to a recipient, and controls messaging system 123 to transmit the correspondence to the recipient. In a case where messaging system 123 is an email system, processor 110 includes the correspondence in an email, and controls messaging system 123 to direct the email to the recipient.

For example, user 101 will input, via user device 130 to computer 105, a unique identifier number of a business entity. Processor 110 will execute method 300 and determine a list of decision-making entities and their decision-making power, and a list of non-decision-making entities and their rollup decision-making entities in the family tree of the business entity received from user 101. Processor 110 will then control messaging system 123 to direct correspondences to one or more of the decision-making entities and/or roll-up decision-making entities, and in practice, one or more people or parties who are employed by the decision-making entities and/or roll-up decision-making entities.

In another example, processor 110 can configure correspondences to a party that is not a decision-making entity, and direct messaging system 123 to send the correspondence to that party. Assume that salesman A and salesman B are employed by Seller, and that salesman A and salesman B would like to sell products from Seller to Company C and Company D, respectively. Assume also that processor 110 determines that Company C is the decision-making entity for Company D. If salesman A successfully sells a product to Company C, processor 110 can automatically send an email to salesman B so that he does not waste further time and effort on Company D, because Company C is going to make a decision for Company D to use the product. If salesman B successfully sells a product to Company D, processor 110 can automatically send an email to salesman A to encourage salesman A to sell the same product to Company C for a bigger deal. Thus, in this example, the recipient of the correspondence is a person or a party who is being provided information based on the identification of the decision-making entity.

System 100 provides benefits such as (1) increasing sales efficiency, where a salesman can focus on high decision-power entities instead of all entities, (2) increasing marketing precision, where marketing activities can focus on high decision-power entities instead of all entities, and (3) increasing efficiency and utilization of data communications by directing correspondences to entities that are most appropriate recipients, rather than broadly, or indiscriminately, transmitting correspondences to many recipients.

Below, we are presenting an end-to-end example of method 300 based on family tree 200.

In step 305, computer 105 receives a request from user device 130. The request contains a unique identifier number of business entity 215.

In step 310, processor 110 first finds the parent of business entity 215, i.e., business entity 210, and then finds the parent of business entity 210, i.e., business entity 205. Since business entity 205 does not have a parent, it is considered to be the global ultimate of the family tree. Processor 110 then constructs the whole family tree by recursively finding all the children, grandchildren, etc. of business entity 205.

In step 315, processor 110 accesses the business rules, for example, "a business entity with more subsidiaries has higher decision-making power than a business entity with fewer subsidiaries".

In step 320, processor 110 derives attributes for each business entity in family tree 200. For example, the number of subsidiaries of business entity 215=0, and the number of subsidiaries of business entity 210=1. According to the business rule, business entity 210 has higher decision-making power than business entity 215.

In step 325, processor 110 assigns a weight to each attribute. For example, if 5 is assigned to be the weight for number of subsidiaries, the decision-making power for business entity 215 will be 0 and the decision-making power for business entity 210 will be 5.

In step 330, if cutoff is chosen to be 3, processor 110 will identify business entity 210 as a decision-making entity, and business entity 215 will not be identified as a decision-making entity.

In step 335, processor 110 will identify business entity 210 as the roll-up decision-making entity for business entity 215.

In step 340, based on the identification result, processor 110 controls messaging system 123 to transmit messages to one or more recipients at decision-making entity 210.

The techniques described herein are exemplary, and should not be construed as implying any particular limitation on the present disclosure. It should be understood that various alternatives, combinations and modifications could be devised by those skilled in the art. For example, system 100 can accommodate more than one user, similar to user 101, and more than one user device, similar to user device 130. Also, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

What is claimed is:

1. A method, performed by a processor, said method comprising:
    (a) receiving a unique identifier of a first entity;
    (b) constructing a family tree of entities that includes said first entity, wherein said constructing comprises:
        accessing a database of data that includes said unique identifier and identifies relationships between entities;
        finding in said database, a second entity that has a relationship to said first entity;
    adding said second entity to said family tree; and
        recursively accessing said database to identify another entity having a relationship with an entity in said family tree, and adding said another entity to said family tree;
    (c) calculating a decision-making power score for each entity in said family tree in accordance with a rule, thus yielding decision-making power scores;
    (d) identifying a decision-making entity in said family tree, based on said decision-making power scores, thus yielding an identification of said decision-making entity; and
    (e) controlling a messaging system of a computer to direct a correspondence to a recipient, based on said identification of said decision-making entity,
    wherein said identifying comprises:
    comparing, to a cutoff, individual decision-making power scores in said decision-making power scores, thus yielding comparisons; and
    identifying said decision-making entity from said comparisons, and
    wherein said identifying further comprises:
    identifying, from said comparisons, a non-decision-making entity;
    traversing said family tree hierarchically, from said non-decision-making entity until encountering said decision-making entity: and
    identifying said decision-making entity as a decision-making entity for said non-decision-making entity.

2. The method of claim 1, wherein said calculating comprises:
    deriving an attribute for each entity in said family tree, based on said rule, thus yielding attributes;
    assigning weights to said attributes, thus yielding weighted attributes; and calculating said decision-making power scores from said weighted attributes.

3. The method of claim 1,
wherein said correspondence is selected from the group consisting of an email, a text message, and a voice message, and
wherein said recipient is selected from the group consisting of a party who is employed by said decision-making entity, and a party who is being provided information based on said identification of said decision-making entity.

4. A system comprising:
a processor; and
a memory that contains instructions that are readable by said processor to cause said processor to perform actions of:
(a) receiving a unique identifier of a first entity;
(b) constructing a family tree of entities that includes said first entity, wherein said constructing comprises:
accessing a database of data that includes said unique identifier and identifies relationships between entities;
finding in said database, a second entity that has a relationship to said first entity;
adding said second entity to said family tree; and
recursively accessing said database to identify another entity having a relationship with an entity in said family tree, and adding said another entity to said family tree;
(c) calculating a decision-making power score for each entity in said family tree in accordance with a rule, thus yielding decision-making power scores;
(d) identifying a decision-making entity in said family tree, based on said decision-making power scores, thus yielding an identification of said decision-making entity; and
(e) controlling a messaging system of a computer to direct a correspondence to a recipient, based on said identification of said decision-making entity,
wherein said identifying comprises:
comparing, to a cutoff, individual decision-making power scores in said decision-making power scores, thus yielding comparisons; and
identifying said decision-making entity from said comparisons, and
wherein said identifying further comprises:
identifying, from said comparisons, a non-decision-making entity;
traversing said family tree hierarchically, from said non-decision-making entity until encountering said decision-making entity: and
identifying said decision-making entity as a decision-making entity for said non-decision-making entity.

5. The system of claim 4, wherein said calculating comprises:
deriving an attribute for each entity in said family tree, based on said rule, thus yielding attributes;
assigning weights to said attributes, thus yielding weighted attributes; and
calculating said decision-making power scores from said weighted attributes.

6. The system of claim 4,
wherein said correspondence is selected from the group consisting of an email, a text message, and a voice message, and
wherein said recipient is selected from the group consisting of a party who is employed by said decision-making entity, and a party who is being provided information based on said identification of said decision-making entity.

7. A storage device comprising instructions that are readable by a processor to cause said processor to perform actions of:
(a) receiving a unique identifier of a first entity;
(b) constructing a family tree of entities that includes said first entity, wherein said constructing comprises:
accessing a database of data that includes said unique identifier and identifies relationships between entities;
finding in said database, a second entity that has a relationship to said first entity;
adding said second entity to said family tree; and
recursively accessing said database to identify another entity having a relationship with an entity in said family tree, and adding said another entity to said family tree;
(c) calculating a decision-making power score for each entity in said family tree in accordance with a rule, thus yielding decision-making power scores;
(d) identifying a decision-making entity in said family tree, based on said decision-making power scores, thus yielding an identification of said decision-making entity; and
(e) controlling a messaging system of a computer to direct a correspondence to a recipient, based on said identification of said decision-making entity,
wherein said identifying comprises:
comparing, to a cutoff, individual decision-making power scores in said decision-making power scores, thus yielding comparisons; and
identifying said decision-making entity from said comparisons, and
wherein said identifying further comprises:
identifying, from said comparisons, a non-decision-making entity;
traversing said family tree hierarchically, from said non-decision-making entity until encountering said decision-making entity: and
identifying said decision-making entity as a decision-making entity for said non-decision-making entity.

8. The storage device of claim 7, wherein said calculating comprises:
deriving an attribute for each entity in said family tree, based on said rule, thus yielding attributes;
assigning weights to said attributes, thus yielding weighted attributes; and
calculating said decision-making power scores from said weighted attributes.

9. The storage device of claim 7,
wherein said correspondence is selected from the group consisting of an email, a text message, and a voice message, and
wherein said recipient is selected from the group consisting of a party who is employed by said decision-making entity, and a party who is being provided information based on said identification of said decision-making entity.

* * * * *